United States Patent
Sun et al.

(10) Patent No.: US 11,494,617 B2
(45) Date of Patent: Nov. 8, 2022

(54) RECOMMENDER SYSTEM USING BAYESIAN GRAPH CONVOLUTION NETWORKS

(71) Applicants: Jianing Sun, Montreal (CA); Yingxue Zhang, Montreal (CA); Florence Robert-Régol, Montreal (CA); Mark Coates, Montreal (CA)

(72) Inventors: Jianing Sun, Montreal (CA); Yingxue Zhang, Montreal (CA); Florence Robert-Régol, Montreal (CA); Mark Coates, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 16/789,325

(22) Filed: Feb. 12, 2020

(65) Prior Publication Data

US 2021/0248449 A1 Aug. 12, 2021

(51) Int. Cl.
*G06N 3/04* (2006.01)
*G06N 3/08* (2006.01)
(Continued)

(52) U.S. Cl.
CPC ....... *G06N 3/0472* (2013.01); *G06F 16/9024* (2019.01); *G06F 17/16* (2013.01);
(Continued)

(58) Field of Classification Search
CPC ...... G06N 3/08; G06N 3/0472; G06N 3/0454; G06N 5/022; G06F 17/18; G06F 17/16;
(Continued)

(56) References Cited

U.S. PATENT DOCUMENTS

2022/0180391 A1* 6/2022 Prakash ............. G06Q 30/0202

FOREIGN PATENT DOCUMENTS

| CN | 110276387 A | 9/2019 |
|----|-------------|--------|
| CN | 110321494 A | 10/2019 |

(Continued)

OTHER PUBLICATIONS

Zhang, Yingxue, et al.; "Bayesian Graph Convolutional Neural Networks for Semi-supervised Classification", arXiv:1811.11103 [stat.ML] Nov. 27, 2018.

(Continued)

*Primary Examiner* — Etienne P Leroux

(57) ABSTRACT

System and method for processing an observed bipartite graph that has a plurality of user nodes, a plurality of item nodes, and an observed graph topology that defines edges connecting at least some of the user nodes to some of the item nodes such that at least some nodes have node neighbourhoods comprising edge connections to one or more other nodes. A plurality of random graph topologies are derived that are realizations of the observed graph topology by replacing the node neighbourhoods of at least some nodes with the node neighbourhoods of other nodes. A non-linear function is trained using the plurality of user nodes, plurality of item nodes and plurality of random graph topologies to learn user node embeddings and item node embeddings for the plurality of user nodes and plurality of item nodes, respectively.

20 Claims, 7 Drawing Sheets

(51) Int. Cl.
| | |
|---|---|
| *G06F 16/901* | (2019.01) |
| *G06F 17/18* | (2006.01) |
| *G06F 17/16* | (2006.01) |
| *G06Q 30/06* | (2012.01) |
| *G06F 16/9536* | (2019.01) |

(52) U.S. Cl.
CPC ............... *G06F 17/18* (2013.01); *G06N 3/08* (2013.01); *G06F 16/9536* (2019.01); *G06Q 30/0631* (2013.01)

(58) Field of Classification Search
CPC ............ G06F 16/9024; G06F 16/9536; G06Q 30/0631
See application file for complete search history.

(56) References Cited

FOREIGN PATENT DOCUMENTS

| CN | 110688474 A | 1/2020 |
|---|---|---|
| WO | 2010025094 A1 | 3/2021 |

OTHER PUBLICATIONS

Pal, Soumyasundar, et al.; "Bayesian Graph Convolutional Neural Networis using Node Copying", arXiv:1911.04965v1 [cs.LG] Nov. 8, 2019.

Hamilton, William L., et al.; "Inductive Representation Learning on Large Graphs", 31st Conference on Neural Information Process Systems (2017), Long Beach, CA, U.S.A. 2017.

Sun, Jianing, et al.; "Multi-Graph Convolution Collaborative Filtering", IEEE International Conference on Data Mining 2019.

Sun, Jianing and Zhang, Yingxue; "Multi-Graph Convolutional Neural Networks for Representation Learning in Recommendation", 33rd Conference on Neural Informational Processing Systems, Vancouver, Canada 2019.

\* cited by examiner

RECOMMENDER SYSTEM USING BAYESIAN GRAPH CONVOLUTION NETWORKS

RELATED APPLICATIONS

None

FIELD

This disclosure relates generally to the processing of graph based data using machine learning techniques, particularly in the context of recommender systems.

BACKGROUND

An information filtering system is a system that removes redundant or unwanted information from an information stream that is provided to a human user in order to manage information overload. A recommender system (RS) is a subclass of information filtering system that seeks to predict the rating or preference a user would give to an item. RSs are often used in commercial applications to guide users to find their true interests among a growing plethora of online information.

Personalized RSs play an important role in many online services. Accurate personalized RSs can benefit users as well as content publishers and platform providers. RSs are utilized in a variety of commercial areas to provide personalized recommendations to users, including for example: providing video or music suggestions for streaming and download content provider platforms; providing product suggestions for online retailer platforms; providing application suggestions for app store platforms; providing content suggestions for social media platforms; and suggesting news articles for mobile news applications or online news websites.

RSs usually employ one or both of collaborative filtering (CF) and content-based filtering. Both of these filtering methodologies apply a personality-based approach that recommends personalized products or services for different users based on their different historical behaviors.

CF methodologies typically build a predictive model or function that is based on a target or active user's past behavior (e.g., items previously purchased or selected and/or a numerical rating given to those items) as well on the past behavior of other users who have behavioural histories similar to that of the active user. By contrast, content-based filtering methodologies utilize a series of discrete, pre-tagged characteristics of an item (item attributes) in order to recommend additional items with similar properties. However, content-based filtering methodologies can be impeded by the fact that a large number of items have a very limited number of associated item attributes.

Some RSs integrate content-based filtering methodologies into CF methodologies to create a hybrid system. However, the lack of suitable item attributes for the exploding number of items that are available through online platforms requires most RSs to still heavily rely on only CF methods that give recommendations based on users' historical behaviors.

CF methodologies can typically be summarized as: Step 1) Look for users who share the same interaction patterns with the active user (the user whom the prediction is to be made); and Step 2) Use the ratings/interactions from those like-minded users found in step 1 to calculate a prediction for the active user. Finding users who share the same interaction patterns requires identification of similar users or similar items. The process of deriving similar users and similar items includes embedding each user and each item into a low-dimensional space created such that similar users are nearby and similar items are nearby. In this regard, an embedding is a mapping of a discrete—categorical—variable to a vector of continuous numbers.

A classic and successful method for CF is matrix factorization (MF). MF algorithms characterize both items and users by vectors in the same space, inferred from observed entries of user-item historical interaction. MF algorithms work by decomposing a user-item interaction matrix into the product of two lower dimensionality rectangular matrices with the goal of representing users and items in a lower dimensional latent space (also known as embedding representation in the context of deep learning algorithms). Deep learning models have been introduced in various applications recently, boosting the performance significantly compared to traditional models. However, deep learning models are not sufficient to yield optimal user/item embeddings due to the lack of explicit encoding of latent collaborative information from user-item interactions, as well as over-reliance on explicit, often sparse, feedback from users.

Therefore, researchers have turned to the emerging field of graph convolution neural networks (GCNNs), and applied GCNNs for recommendation by modeling the user-item interaction history as a bipartite graph. GCNNs are trained to learn user and item representations of user and item nodes in a graph structure and model user-item interaction history as connecting edges between the nodes. The vector representation of a node is learned by iteratively combining the embedding (i.e., mapping of a discrete variable to a vector of continuous numbers) of the node itself with the embeddings of the nodes in its local neighborhood. In the context of neural networks, embeddings are low-dimensional, learned continuous vector representations of discrete variables. Neural network embeddings are useful because they can reduce the dimensionality of categorical variables and meaningfully represent categories in the transformed space.

Most existing methods split the process of learning a vector representation (i.e., embedding) of a node into two steps: neighborhood aggregation, in which an aggregation function operates over sets of vectors to aggregate the embeddings of neighbors, and center-neighbor combination that combines the aggregated neighborhood vector with the central node embedding. These methods learn node embeddings on graphs in a convolution manner by representing a node as a function of its surrounding neighborhood.

Existing GCNN based bipartite graph RS solutions treat observed graphs as a ground-truth depiction of relationships and thus treat the observed graph as very strong prior knowledge. However, because of data sparsity, the bipartite user-item interaction graphs are in fact often missing many edges, reflecting very limited information.

Learning on fixed and incomplete graphs omits all the potential preferences of users, and thus falls short in terms of diversity and efficacy in RS applications. This can lead to deterioration in recommendation performance when learning on graphs. Accordingly there is a need for a GCNN-based recommender system that is able compensate for data sparsity that is inherently present in an environment of rapidly expanding numbers of users and volume of content.

SUMMARY

According to a first aspect of the present disclosure, a computer implemented method is provided for processing an observed bipartite graph that has a plurality of user nodes, a plurality of item nodes, and an observed graph topology that defines edges connecting at least some of the user nodes to some of the item nodes such that at least some nodes have node neighbourhoods comprising edge connections to one or more other nodes. The method includes deriving a plurality of random graph topologies that are realizations of the observed graph topology by replacing the node neighbourhoods of at least some nodes with the node neighbourhoods of other nodes; and learning a non-linear function using the plurality of user nodes, plurality of item nodes and plurality of random graph topologies to generate user node embeddings and item node embeddings for the plurality of user nodes and plurality of item nodes, respectively.

In accordance with the preceding aspect, replacing the node neighbourhoods of at least some nodes with the node neighbourhoods of other nodes is based on probabilistic sampling based on calculated similarities between node pairs.

In accordance with any of the preceding aspects, at least some nodes and the other nodes are each respective user nodes, and deriving the plurality of random graph topologies comprises defining a user-user distance matrix that specifies distances for each node pair of the user nodes, and replacing the node neighbourhoods of at least some nodes with the node neighbourhoods of other nodes comprises sampling the other nodes based on probability values that correspond to the distances specified in the user-user distance matrix, wherein smaller distances represent greater similarities between user nodes and correspond to greater probability values than larger distances.

In accordance with any of the preceding aspects, the distance specified for each pair of user nodes based on a number of item nodes in a union of the node neighborhoods of the pair of user nodes and a number of item nodes in an intersection of the node neighborhoods of the pair of user nodes.

In accordance with any of the preceding aspects, the distance specified for each pair of user nodes is further based on a popularity of any item nodes in the intersection of the node neighborhoods of the pair of user nodes.

In accordance with any of the preceding aspects, learning the non-linear function comprises generating a respective set of user and item node embeddings for each of the random graph topologies using the user nodes and item nodes, and determining a final set of user and item node embeddings based on the generated sets of user and item node embeddings.

In accordance with any of the preceding aspects, determining the final set of user and item node embeddings comprises averaging the user node embeddings generated in respect of each user node across all the random graph topologies and averaging the item node embeddings generated in respect of each item node across all of the random graph topologies.

In accordance with any of the preceding aspects, pre-training a graph convolution neural network (GCCN) to generate an initial set of user and item node embeddings based on the observed bipartite graph, wherein learning the non-linear function comprises, for each of the random graph topologies, separately retraining the pre-trained GCCN to generate the user node embeddings and item node embeddings for the random graph topology.

In accordance with any of the preceding aspects, the plurality of user nodes of the observed bipartite graph are each represented as respective user features vectors that represent attributes of respective users, the plurality of item nodes are each represented as respective item node feature vectors that represent attributes of respective items, and the observed graph topology is defined in an adjacency matrix; and the user node embeddings are a lower dimensional representation of respective user features vectors, and the item node embeddings are a lower dimensional representation of respective item features vectors.

In accordance with any of the preceding aspects, the method includes determining user specific item recommendations based on the user node embeddings and item node embeddings.

According to a further aspect of the present disclosure, a graph processing system is provided for processing an observed bipartite graph that comprises a plurality of user nodes, a plurality of item nodes, and a graph topology that defines edges connecting at least some of the user nodes to some of the item nodes such that at least some nodes have node neighbourhoods comprising connections to one or more other nodes. The system includes: a graph generation module configured to derive a plurality of random graph topologies that are realizations of the observed graph topology by replacing the node neighbourhoods of at least some nodes with the node neighbourhoods of other nodes; and an embedding module configured to learn a non-linear function using the plurality of user nodes, plurality of item nodes and the random graph topologies to generate user node embeddings and item node embeddings for the plurality of user nodes and plurality of item nodes, respectively.

In accordance with the preceding further aspect, the graph generation module is configured to replace the node neighbourhoods of at least some nodes with the node neighbourhoods of other nodes based on probabilistic sampling based on calculated similarities between node pairs.

In accordance with any of the preceding further aspects, the at least some nodes and the other nodes are user nodes and the graph generation module includes: a similarity operation that is configured to define a user-user distance matrix that specifies distances for each node pair of the user nodes; and a graph sampling operation configured to replace the node neighbourhoods of at least some user nodes with the node neighbourhoods of other user nodes by sampling the other user nodes based on probability values that correspond to the distances specified in the user-user distance matrix, wherein smaller distances represent greater similarities between user nodes and correspond to greater probability values than larger distances.

In accordance with any of the preceding further aspects, the distance specified for each pair of user nodes based on a number of item nodes in a union of the node neighborhoods of the pair of user nodes and a number of item nodes in an intersection of the node neighborhoods of the pair of user nodes.

In accordance with any of the preceding further aspects, the distance specified for each pair of user nodes is further based on a popularity of any item nodes in the intersection of the node neighborhoods of the pair of user nodes.

In accordance with any of the preceding further aspects, the embedding module is configured to learn the non-linear function by generating a respective set of user and item node embeddings for the non-linear function for each of the random graph topologies, and determining a final set of user and item node embeddings based on the generated sets of user and item node embeddings.

In accordance with any of the preceding further aspects, the embedding module includes an averaging operation configured to determine the final set of user and item node embeddings by averaging the user node embeddings generated in respect of each user node across all of the random graph topologies and averaging the item node embeddings generated in respect of each item node across all of the random graph topologies.

In accordance with any of the preceding further aspects, the non-linear function is implemented using a graph convolution neural network (GCCN), the embedding module 108 being configured to pre-train the GCCN to generate an initial set of user and item node embeddings based on the user nodes, item nodes and observed graph topology of the observed bipartite graph, and to learn the non-linear function by separately retraining the pre-trained GCCN to generate the user node embeddings and item node embeddings for each of the random graph topologies.

In accordance with any of the preceding further aspects, the plurality of user nodes of the observed bipartite graph are each represented as respective user features vectors that represent attributes of respective users, the plurality of item nodes are each represented as respective item node feature vectors that represent attributes of respective items, and the graph topology is defined in an adjacency matrix that specifies the edges connecting user nodes to item nodes to represent an interaction history between user nodes and item nodes; and the user node embeddings are a lower dimensional representation of respective user features vectors, and the item node embeddings are a lower dimensional representation of respective item features vectors.

In accordance with any of the preceding further aspects, the system includes a recommender selection operation configured to determine user specific item recommendations based on the user node embeddings and item node embeddings.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

According to example embodiments, a graph processing system is disclosed that incorporates a Bayesian graph convolution neural network (GCNN) based recommender system (RS).

Figure 1:
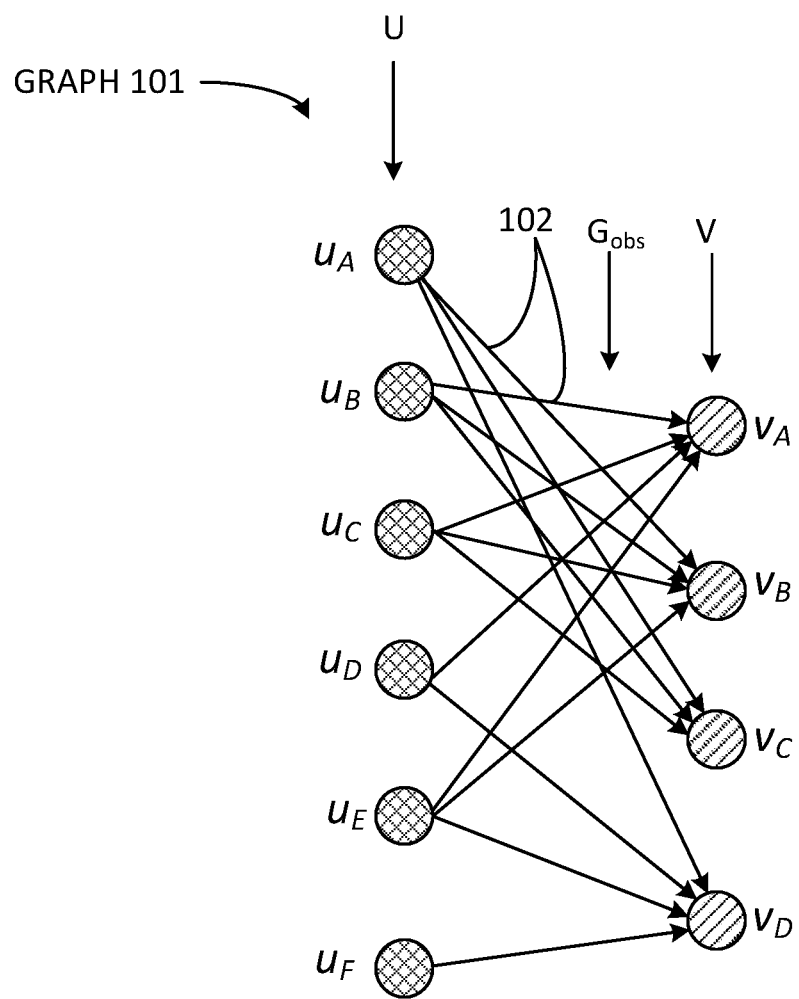
FIG. 1 is a block diagram illustrating an example of a bipartite graph.

A graph is a data structure that comprises nodes and edges. Each node represents an instance or data point that is defined by measured data represented as a set of node features (e.g., a multidimensional feature vector). Each edge represents a relationship that connects two nodes. A bipartite graph is a form of graph structure in which each node belongs to one of two different node types and direct relationships (e.g., 1-hop neighbors) only exist between nodes of different types. FIG. 1 illustrates a simplified representation of a sample of an observed bipartite graph 101 that includes two types of nodes, namely user nodes $u_A$ to $u_F$ (collectively user node set U) and item nodes $v_A$ to $v_D$ (collectively item node set V) In the present disclosure, "u" is used to refer to a generic user node or nodes and "v" is used to refer to a generic item node or nodes. Each respective user node u represents an instance of a user. For example, user node $u_i$ may represent a specific user i, which may for example be the user associated with a specific registered user account or unique user identifier. Each respective item node v represents an instance of a unique item. For example item node $v_j$ may represent a specific instance of an item j. Items may for example be products or services that are available to a user. For example, in various scenarios, items may be: audio/video media items (such as a movie or series or video) that a user can stream or download from an online video content provider; audio media items (such as a song or a podcast) that a user can stream or download from an online audio content provider; image/text media items (such as new articles, magazine articles or advertisements) that a user can be provided with by an online content provider; software applications (e.g., online apps) that a user can download or access from an online software provider such as an app store; and different physical products that a user can order for delivery or pickup from an online retailer. The examples of possible categories of items provided above is illustrative and not exhaustive.

In example embodiments, user nodes $u_A$ to $u_F$ and item nodes $v_A$ to $v_F$ are each defined by a respective set of node features. For example, each user node u is defined by a respective user node feature vector $x_u$ that specifies a set of user node features. Each user node feature numerically represents a user attribute. Examples of user attributes my for example include user id, age, sex, relationship status, pet ownership, etc. Collectively, user node set U can be represented as a user node feature matrix $X_u$, where each row in the matrix is the feature vector $x_u$ for a respective user node u. Each item node v is defined by a respective item node feature vector $x_v$ that specifies a set of item node features. Each item node feature numerically represents an item attribute. Examples of item attributes may for example include, in the case of a movie video: id, movie title, director, actors, genre, country of origin, release year, period depicted, etc. Collectively, item node set V can be represented as an item node feature matrix $X_v$, where each row in the matrix is the feature vector $x_v$ for a respective item node u.

The edges 102 that connect user nodes u to respective item nodes v indicate relationships between the nodes and collectively the edges 102 define the observed graph topology $G_{obs}$. In some example embodiments, the presence or absence of an edge 102 between nodes represents the existence or absence of a predefined type of relationship between the user represented by the user node and the item represented by the item node. For example, the presence or absence of an edge 102 between a user node u and an item node v indicates whether or not a user has previously undertaken an action that indicates a sentiment for or interest in a particular item, such as "clicking" on a representation of the item or submitting a scaled (e.g., 1 to 5 star) or binary (e.g. "like") rating in respect of the item. For example, edges 102 can represent the click or rating history between users and items. In illustrative embodiments described below, edges 102 convey binary relationship information such that the presence of an edge indicates the presence of a defined type of relationship (e.g. user i has previously "clicked" or rated/liked an item j) and the absence of an edge indicates an absence of such a relationship. However, in further embodiments edges 102 may be associated with further attributes that indicate a relationship strength (for example a number of "clicks" by a user in respect of a specific item, or the level of a rating given by a user). In some embodiments, an edge 102 may indicate that a user has purchased, ordered or otherwise consumed an item.

In example embodiments where edges 102 convey the presence or absence of a defined relationship, the graph topology $G_{obs}$ can be represented by an adjacency matrix A that defines a matrix of binary values that indicate the presence or absence of a connecting edge between each user node u and each item node v. In some examples, adjacency matrix A corresponds to a "click" or "rating" matrix.

Thus, bipartite graph 101 includes information about users (e.g., user node set U, represented by user node feature matrix $X_u$), information about items (e.g., item node set V, represented by item node feature matrix $X_v$), and information about the historical interactions between users and items (e.g. graph topology $G_{obs}$, represented by adjacency matrix A).

In many real-life cases, the information present in an observed bipartite graph 101 has inherent data sparsity problems in that the historical interaction data present in graph topology $G_{obs}$ will often be quite limited, especially in the case of new users and items that have few interaction records. Thus, many user nodes and many item nodes may have very few connecting edges. Existing RS solutions may also tend to over-rely on the observed bipartite graph 101, and in particular the graph topology, as an absolute ground truth. Furthermore, existing RS solutions can be biased towards recommending similar items to those represented in a user's behavioral history (e.g. user likes brand "A" cola, therefore recommend brand "B" and "C" cola), leading to a lack of diversity in recommendation results (e.g. user may benefit from a snack food recommendation to go with the brand "A" cola they have previously liked, but the RS just recommends other types of colas).

Accordingly, as will be described in greater detail below, example embodiments are described that may in some applications address one or more of the issues noted above that confront by RS solutions. In particular, in example embodiments, a graph processing system is disclosed wherein the observed graph topology $G_{obs}$ is not considered as a ground truth, but rather as a sample from a parametric family of random graph topologies. The graph processing system is configured to generate a plurality of graph topologies $\{G_1, \ldots, G_M\}$ that belong to the same parametric family of random graphs as observed graph topology $G_{obs}$, and then use a GCNN to generate user-item relationships (e.g., predict recommendations) based on the user nodes, U, item nodes V, and the generated plurality of graph topologies $\{G_1, \ldots, G_M\}$. Thus, in the presently described graph processing system, relationship embeddings are generated on based on a plurality of randomly generated graph topologies, rather than directly from observed bipartite graph topology represented by adjacency matrix A.

Figure 2:
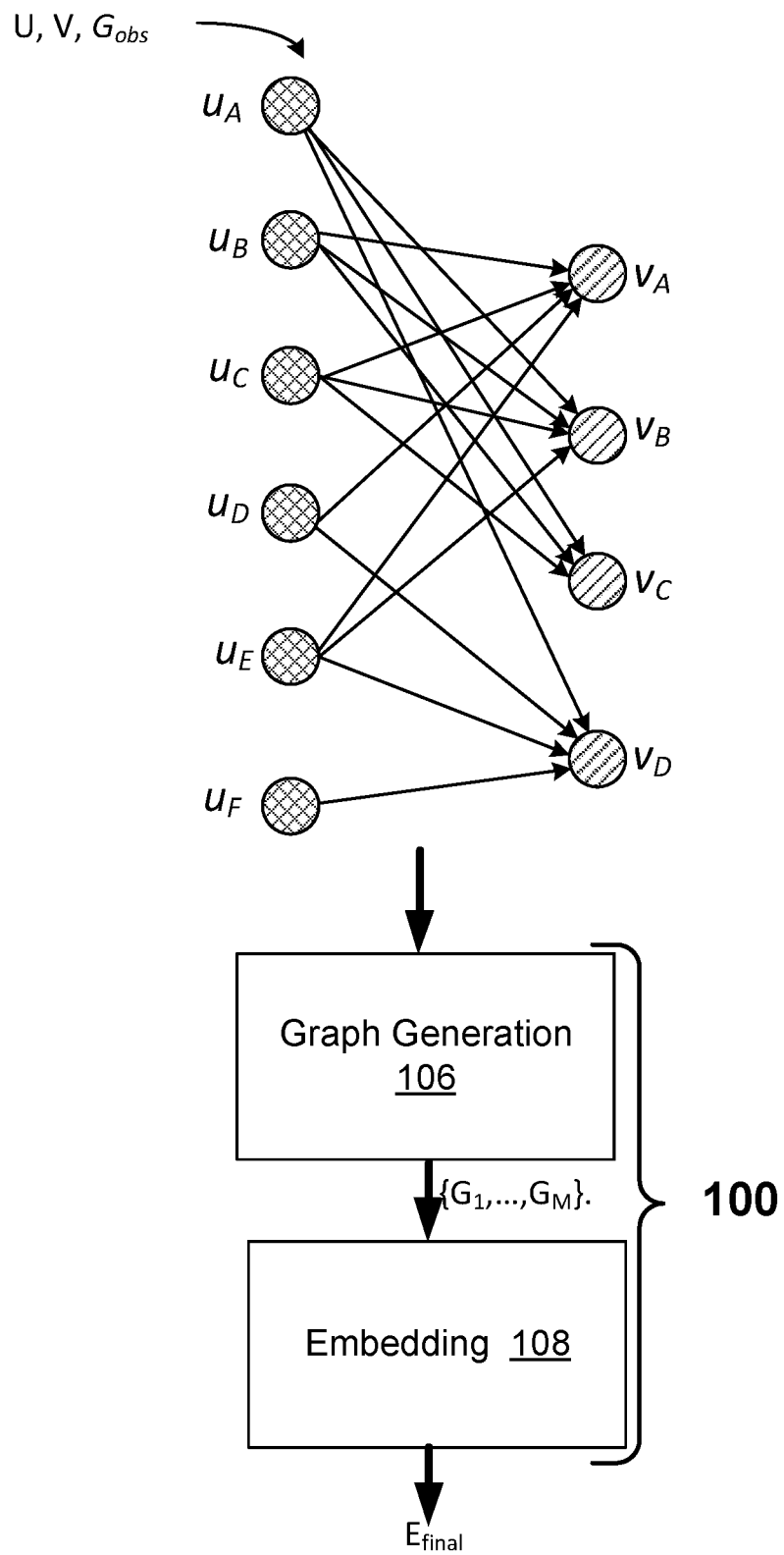
FIG. 2 is a block diagram illustrating an example of a machine learning based graph processing system for processing graph structured data according to example embodiments.

In this regard, FIG. 2 is a block diagram illustrating an example of a machine learning based graph processing system 100, for processing bipartite graph structured data according to example embodiments. In the illustrated example, graph processing system 100 includes a graph generation module 106 and a predictive embedding module 108. Graph generation module 106 is configured to generate a set of M random bipartite graph topologies $\{G_1, \ldots, G_M\}$ that are realizations of observed bipartite graph topology $G_{obs}$. In example embodiments M is a hyper-parameter selected based on historical experiences with similar datasets. Embedding module 108 is configured to apply Bayesian approximation methods to jointly learn user and item embeddings for the user nodes u and item nodes v for each of the M bipartite graph topologies $\{G_1, \ldots, G_M\}$.

Graph generation module 106 will be described with reference to FIG. 3. In the illustrated example, graph generation module 106 includes a similarity operation 302 and a graph sampling operation 304. Similarity operation 302 is configured to define a user-user distance matrix DIST that specifies distances for each user node u relative to all other user nodes u. User-user distance matrix DIST can be calculated using different algorithms. Two examples of possible implementations for similarity operation 302 will now be described, namely (1) a function based on the Jaccard index; and (2) a function that determines a probabilistic distance metric based on a 2-hop walk.

Figure 4:
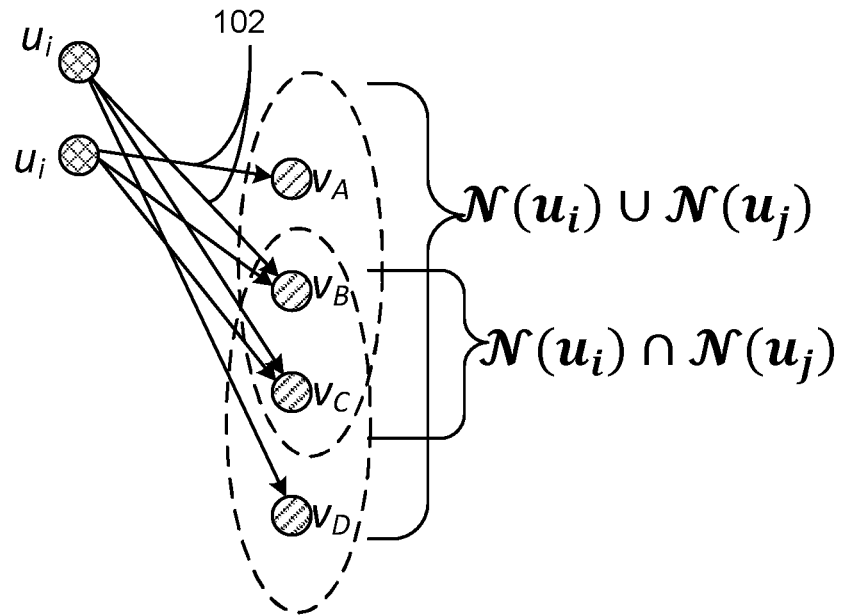
FIG. 4 is a block diagram illustrating part of a bipartite graph.

The Jaccard index, also known as the Intersection over Union, is a statistical metric used for gauging the similarity and diversity of sample sets. In example embodiments, the sample sets are the interacted history (neighbor set) of users. In this regard, FIG. 4 illustrates an example of a pair of user nodes $(u_i, u_j)$ and the item nodes $(v_A, v_B, v_C, v_D)$ that the user nodes are connected to by respective edges. In the example of FIG. 4, the direct (1-hop) neighbors of user node $u_i$ are $\{v_B, v_C, v_D\}$, and the direct (1-hop) neighbors of user node $u_j$ are $\{v_A, v_C, v_D\}$. $N(u_i)$ and $N(u_j)$ respectfully represent the neighborhood sets for user nodes $u_i$ and $u_j$. For every two user nodes, $(u_i, u_j)$ the Jaccard distance dist$(u_i, u_j)$ is the size of the intersection of the neighborhood sets (e.g., number of item nodes in common, which may for example be the "common clicks", which is 2 in the illustrated example) divided by the size of the union of the neighborhood sets (e.g., total number of unique item nodes included in the two sets combined, which is 4 in the illustrated example), mathematically represented as (Equation 1):

$$\text{dist}(u_i, u_j) = \frac{N(u_i) \cap N(u_j)}{N(u_i) \cup N(u_j)} \quad \text{(Eq. (1))}$$

In example embodiments where similarity operation 302 is based on the Jaccard index, the user-user distance matrix DIST is populated by performing the Jaccard distance calculation of Eq. (1) for every pair of user nodes $(u_i, u_j)$ included in the observed bipartite graph $G_{obs}$.

Figure 5:
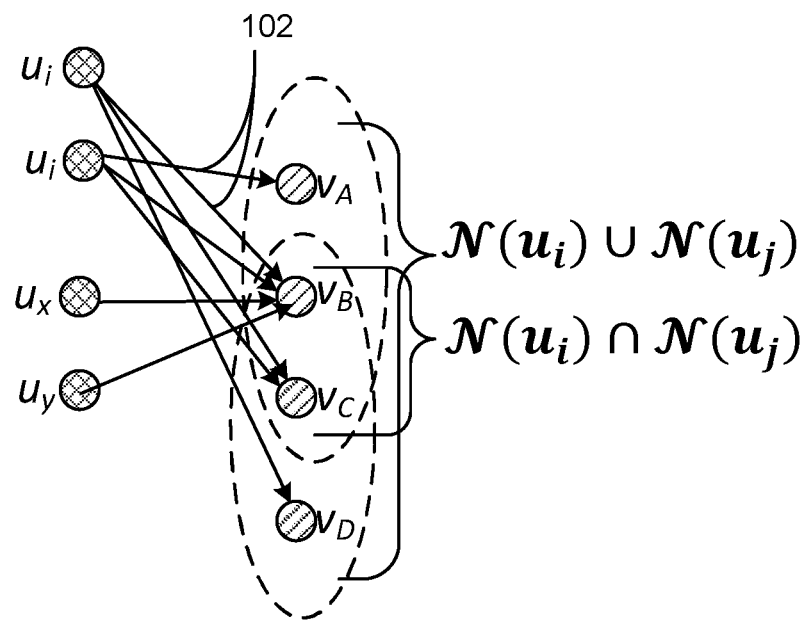
FIG. 5 is a block diagram illustrating part of a bipartite graph.

In the alternative case where similarity operation 302 is configured to determine a probabilistic distance metric based on a 2-hop walk, increased weighting is placed on situation where two user nodes are connected to an unpopular common item as opposed to the situation where two user nodes are connected to a popular common item. In this regard, when identifying common neighbors, a 2-hop walk is used to factor in the popularity of item nodes. This is illustrated in the example of FIG. 5, which is the same bipartite graph example of FIG. 4 except that further user nodes $u_x$ and $u_y$ are introduced, each having a connection to item node $v_b$. Accordingly, in the example of FIG. 5, both of user nodes $u_x$ and $u_y$ are 2-hop neighbors of user nodes $u_i$, $u_j$ through common item node $v_B$, indicating that item node $v_B$ represents a popular item, as opposed to item node $v_C$ that is only connected to user nodes $u_i$, $u_j$. In example embodiments, the connection of user nodes $u_i$, $u_j$ to common unpopular node $v_C$ is interpreted as a greater show of similarity between user nodes $u_i$, $u_j$ than the connection of user nodes $u_i$, $u_j$ to popular node $v_B$. In such example embodiments, user-user distance matrix DIST is populated based with node-node distance values represented by the distance equation (2):

$$\text{dist}(u_i, u_j) = \frac{\sum_{v \in \mathcal{N}(u_i) \cap \mathcal{N}(u_j)} 1/D(v)}{\mathcal{N}(u_i) \cup \mathcal{N}(u_j)} \quad \text{(Eq. (2))}$$

In distance equation (2), the intersection of the neighborhood sets is normalized by degree $D(v)$, which is the number of user nodes $u$ that are directly connected to the item node $v$.

Graph sampling operation 304 is configured to repeatedly sample observed graph topology $G_{obs}$ based on the values in user-user distance matrix DIST to generate a set of random graph topologies $\{G_1, \ldots, G_M\}$ that includes M random realizations of observed graph topology $G_{obs}$. In particular, graph sampling operation 302 is configured to create realizations $\{G_1, \ldots, G_M\}$ of graph topology $G_{obs}$ in which the connections to direct (i.e., 1-hop) item node v neighbors of user nodes u are replaced with connections to direct item node v neighbors of similar user nodes u. In this respect, graph sampling operation 302 is configured to generate a new graph topology in which the direct neighborhoods of user nodes are replaced with copies of the neighborhoods of other, similar, user node neighborhoods. The distance values included in user-user distance matrix DIST correspond to distance probabilities, with a shorter distance between two respective user nodes indicating a higher similarity between the two user nodes and a higher probability that the direct neighborhood of one of the user nodes will be copied and used to replace the direct neighborhood of the other node.

Figure 3:
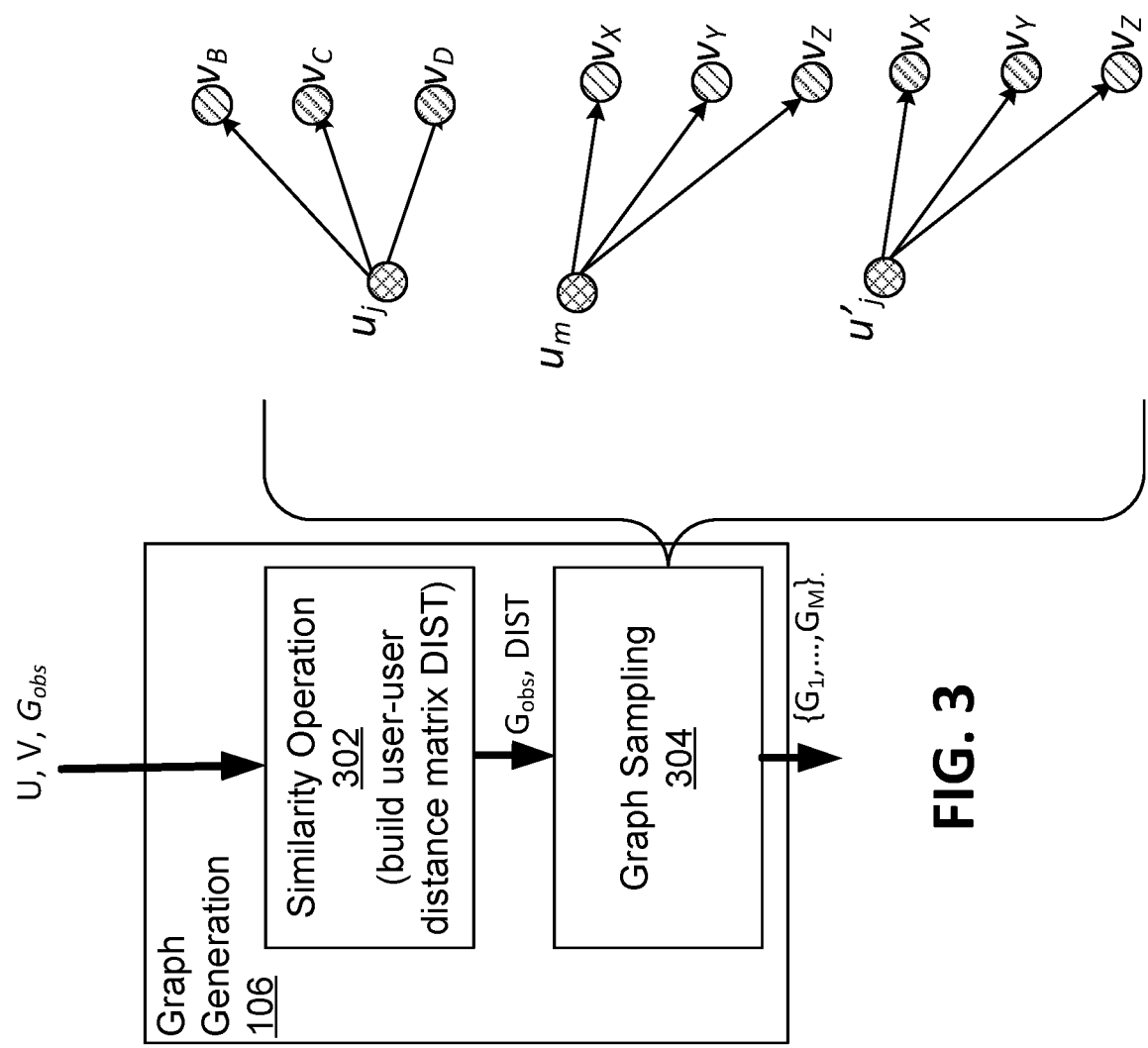
FIG. 3 is a block diagram illustrating graph generation module of the graph processing system of FIG. 2.

In this regard, FIG. 3 graphically illustrates an example of neighborhood copying. In the example of FIG. 3, user nodes $u_j$ and $u_m$ are both observed nodes in user node set U of bipartite graph 101, and have a direct connection represented as an edge in observed in graph topology $G_{obs}$. Based on distance metric $\text{dist}(u_j, u_m)$ a random determination is made to replace the direct neighborhood of user node $u_j$ (e.g., connections to item nodes $\{v_B, v_C, v_D\}$) with the direct neighborhood of user node $u_m$ (e.g., connections to item nodes $\{v_X, v_Y, v_Z\}$), resulting in sampled user node $u'_j$. The node sampling process is repeated for all user nodes u in observed bipartite graph 101 to generate a random graph topology realization $G \in \{G_1, \ldots, G_M\}$ of graph topology $G_{obs}$. The entire process is repeated M times to provide M random graph topology realizations $\{G_1, \ldots, G_M\}$.

In example embodiments, graph sampling operation 304 effectively generates M different adjacency matrices $\{A_1, \ldots, A_M\}$ to replace the observed adjacency A.

In example embodiments, graph sampling operation 304 is configured to generate each random graph topology realization $G \in \{G_1, \ldots, G_M\}$ of graph topology $G_{obs}$ based on an auxiliary random vector $\zeta \in \{1, 2, \ldots, N\}^N$, where N is the number of user nodes in observed graph topology $G_{obs}$, and the j'th entry $\zeta^j$ denotes the user node whose edges and direct neighbor item nodes v are to replace the edges of the j'th node in the observed graph topology $G_{obs}$. In example embodiments, the posterior distribution of random vector $\zeta$ is defined by the following Equation (3):

$$p(\zeta | G_{obs}) = \prod_{j=1}^{N} p(\zeta^j | G_{obs}) \quad \text{(Eq. (3))}$$

$$p(\zeta^j = m | G_{obs}) = \frac{\text{dist}(j, m)}{\sum_{t=1}^{|U|} \text{dist}(j, m)}$$

where dist(j,m) is the calculated distance specified in similarity matrix DIST.

Accordingly, in example embodiments, graph sampling operation 304 generates a random graph topology realization $G \in \{G_1, \ldots, G_M\}$ by applying a generative function represented by the equation (4):

$$p(G | G_{obs}, \zeta) = \prod_{j=1}^{N} e^{1\{g_j - g_{obs}^j - \zeta\}} (1-e)^{1\{g_j - g_{obs}^j - \zeta\}} \quad \text{(Eq. (4))}$$

The generative function of Equation (4) is repeated M times, resulting in M different graph topologies $\{G_1, \ldots, G_M\}$, each of which belongs to the same parametric family of random graph topologies as the observed graph topology $G_{obs}$.

Figure 6:
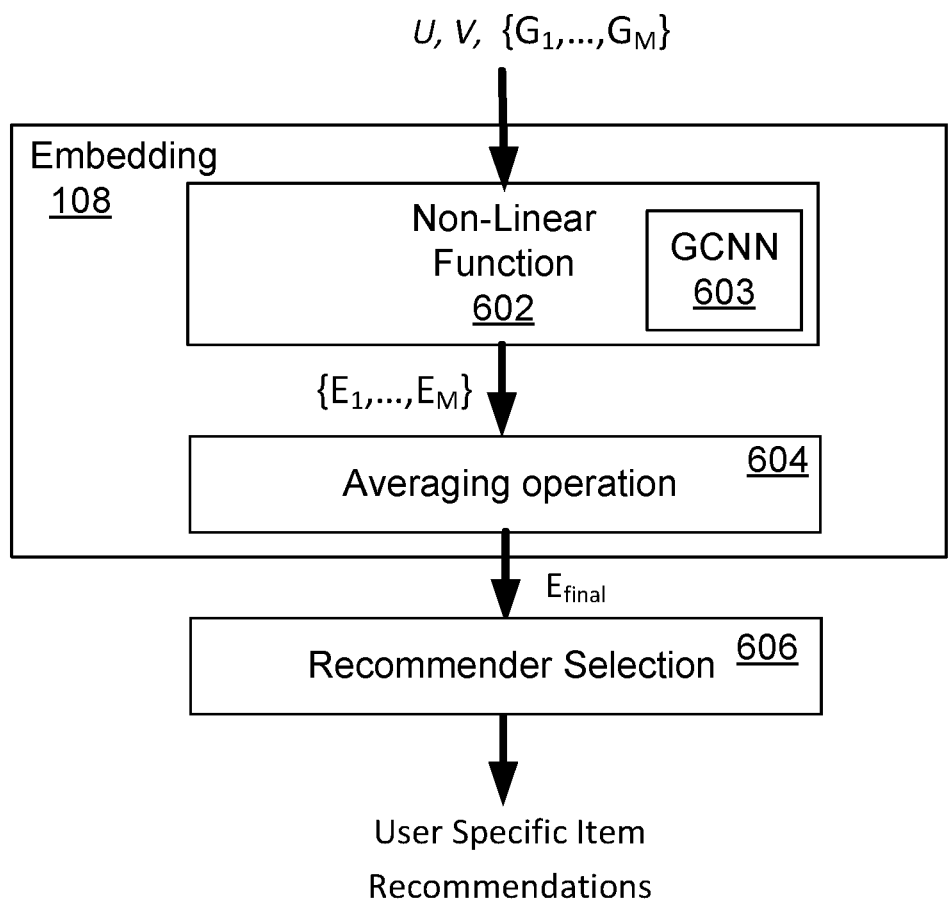
FIG. 6 is a block diagram illustrating a non-linear function of the graph processing system of FIG. 2.

Referring to FIG. 6, in example embodiments, embedding module 108 is configured to apply a Bayesian approximation or non-linear function 602 in respect of each of the M different graph topologies $\{G_1, \ldots, G_M\}$ to jointly learn user and item node embeddings $e_u$, $e_v$ for each of the user and item nodes, respectively, for each of the M graph topologies. The user and item embeddings generated for each user node and item node of the M graphs are then averaged for each node by an averaging operation 604 to provide a final embedding for each node.

In an example embodiment, the non-linear function 602 is implemented using one or more GCNNs 603. In this regard, GCNN 603 may take the form of any bipartite graph convolution neural network that is suitable for implementing an RS, and is configured to process a bipartite graph based on a set of learnable parameters (e.g., weights W). In example embodiments, GCNN 603 is initially pre-trained using conventional GCCN training methodologies to learn an initial set of weights $W_{init}$ and an initial set of user and item node embeddings $E_{init} = \{e_{u(1)}{}^0, \ldots, e_{u(N)}{}^0\}$ and $\{\{e_{v(1)}{}^0, \ldots, e_{v(F)}{}^0\}$, where N is the number of user nodes u and F is the number of item nodes v.

The M different graph topologies $\{G_1, \ldots, G_M\}$ are then used to retrain the GCNN 603. GCNN 603 is independently trained for each of the M different graph topologies $\{G_1, \ldots, G_M\}$ in conjunction with user node set U and item node set V to learn respective sets of GCNN weights $\{W_1, \ldots, W_M\}$ and respective sets of user and item node embeddings $\{E_1, \ldots, E_M\}$, where the item and user node embeddings for a particular graph topology $G_j$ is $E_j$=(user node embeddings $\{e_{u(j,1)}, \ldots, e_{u(j,N)}\}$ and item node node embeddings $\{e_{v(j,1)}, \ldots, e_{v(j,F)}\}$). For training in respect of each of the M different graph topologies $\{G_1, \ldots, G_M\}$, the GCNN 603 is reinitialized for each individual graph topology $\{G_1, \ldots, G_M\}$ with the initial set of weights $W_{init}$ and initial set of user and item node embeddings $E_{init}$ generated in respect of observed graph topology $G_{obs}$. In some examples, a software implementation of GCNN 603 may be repeatedly trained for each of the M different graph topologies $\{G_1, \ldots, G_M\}$. In some examples, multiple software implementations of GCNN 603 may be trained in parallel in respect of a plurality of the M different graph topologies $\{G_1, \ldots, G_M\}$.

Accordingly, non-liner function 602 outputs M sets of embeddings $\{E_1, \ldots, E_M\}$, with each embedding set $E_i$ including low-dimensional representations of each of the user nodes u and item nodes v of a respective graph topology G that is itself a randomized realization of the observed graph topology $G_{obs}$. The resulting embeddings over all the graph topologies $\{G_1, \ldots, G_M\}$ are then averaged for each item node u and each user node v by an averaging operation 604 to generate a set of final embeddings $E_{final}$=user node embeddings $\{e^*_{u(1)}, \ldots, e^*_{u(N)}\}$ and item node embeddings $\{e^*_{v(1)}, \ldots, e^*_{v(F)}\}$.

In at least some applications, using a randomly generated set of graph topologies $\{G_1, \ldots, G_M\}$ that are derived from the same parametric family as observed graph topology $G_{obs}$ to retrain a GCNN that has been previously trained using observed graph $G_{obs}$ topology may improve the quality of embeddings by introducing uncertainties into the learning process.

In summary, in example embodiments described above, graph generation module 106 implements a neighborhood copying graph generative framework that learns generative operations (e.g., similarity operation 302 and graph sampling operation 304) from the observed bipartite graph 101 (which includes user node set U, item node set V, and observed graph topology $G_{obs}$). A set of generated graph topologies $\{G_1, \ldots, G_M\}$ are then used with the user node set U, item node set V to learn a non-liner function 602 to capture the hidden preferences of users and introduce diversity. In example embodiments, the graph sampling operation 304 applies probabilistic sampling to generate random graph topologies $\{G_1, \ldots, G_M\}$. In example embodiments, non-linear function 602 GCNN 603 is pre-trained using the user node set U, item node set V and graph topology $G_{obs}$ of observed graph 101, and then retrained for each of the generated random graph topologies $\{G_1, \ldots, G_M\}$ to produce respective embedding sets $\{E_1, \ldots, E_M\}$, which are then averaged on a per node basis to provide final embeddings $E_{final}$.

The embeddings in the set of final embeddings $E_{final}$ can then be processed using known RS methodologies to provide user specific item recommendations. In this regard, in example embodiments a recommender selection operation 606 can be combined with graph processing system 100 to implement an RS. As noted above, final embeddings $E_{final}$ includes a final user node embedding $e_u^*$ for each of the N user nodes and a final item node embedding $e_v^*$ for each of the F item nodes. In an example embodiment, recommender selection operation 606 is configured to determine user specific recommendations as follows. For each user-item pair, a respective pairwise dot product for the user node embedding $e_u^*$ and item node embedding $e_v^*$ is computed (e.g., $e_u^* \cdot e_v^*$). Thus in the case of F item nodes v, for each user node $u_i$, F scaler value dot products will be calculated. Each scaler value represents probability prediction that the user i associated with a user node $u_i$ will click on the respective item j that the scaler value has been calculated in respect of. In the case of an RS that is configured to recommend up to K items, the K items that were previously unconnected to the user and that have the highest scaler values calculated in respect of the user will be selected for recommendation to the user.

Thus, in some examples user specific item recommendations can be used to generate targeted messages that are communicated to the specific users. For example, the targeted messages may be generated on an automated computer based RS operated by a platform provider. An electronic device associated with the user may access or receive the targeted messages through a communications network, and the presented to the user with a representation of the targeted message through a user interface of the electronic device.

Figure 7:
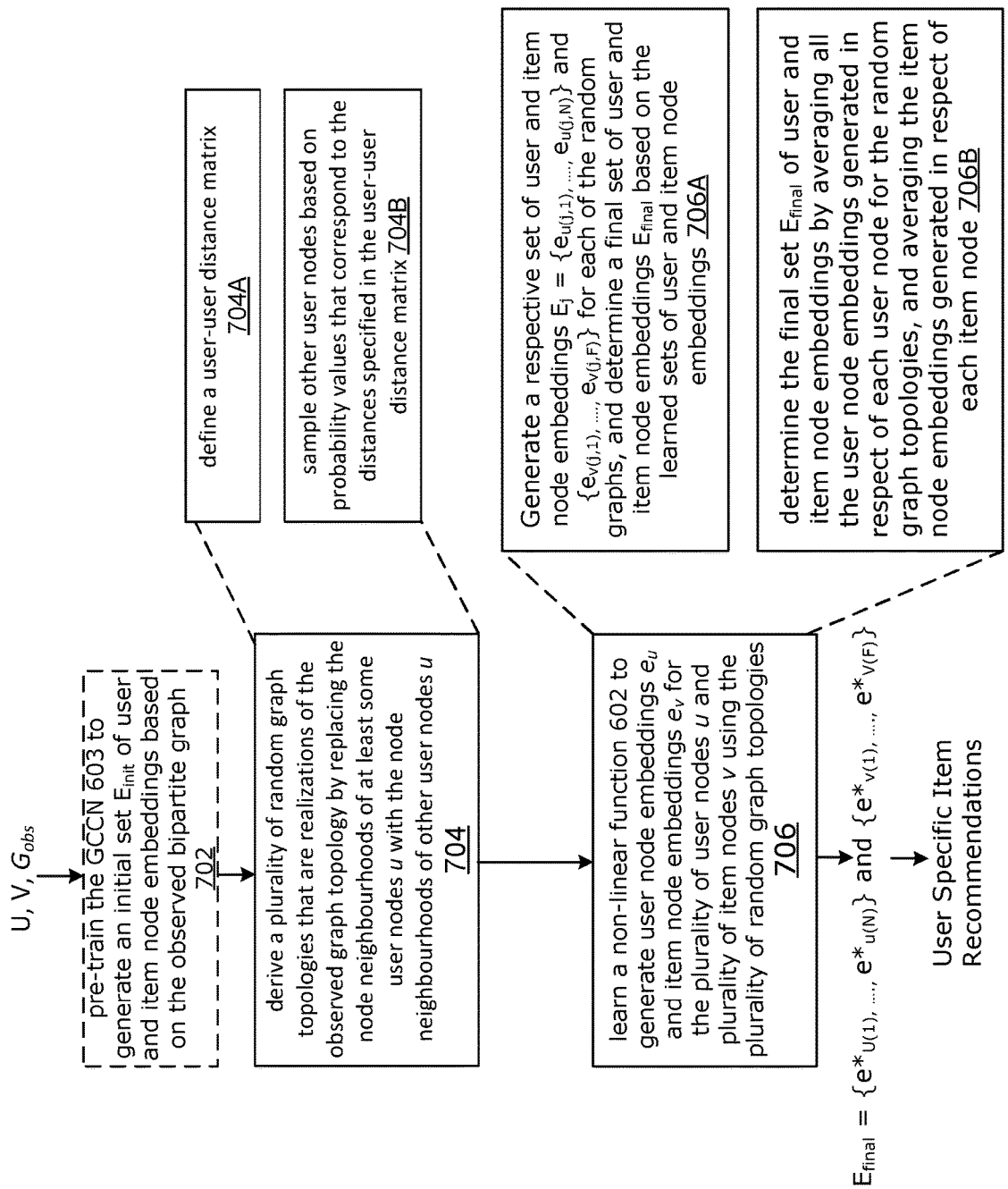
FIG. 7 is a flow diagram of a process performed using the graph processing system of FIG. 2 according to example embodiments.

FIG. 7 is a flow diagram of actions performed by graph processing system 100 according to example embodiments. Graph processing system 100 is configured to process an observed bipartite graph 101 that includes user nodes u, item nodes v, and edges 102 connecting at least some of the user nodes u to some of the item nodes v such that at least some of the user nodes u have node neighbourhoods N(u) comprising one or more item nodes v.

Graph generation module 106 is configured to derive a plurality of random graph topologies $\{G_1, \ldots, G_M\}$ that are realizations of the observed bipartite topology $G_{obs}$ by replacing the node neighbourhoods of at least some user nodes u with the node neighbourhoods of other user nodes u (Action 704). Embedding module 108 is configured to learn non-linear function 602 using the user node set U, item node set V of the observed graph 101 along with the plurality of random graph topologies $\{G_1, \ldots, G_M\}$ to generate user node embeddings $\{e^*_{u(1)}, \ldots, e^*_{u(N)}\}$ and item node embeddings $\{e^*_{v(1)}, \ldots, e^*_{v(F)}\}$ for the plurality of user nodes u and plurality of item nodes v, respectively. (Action 706).

In example embodiments, graph generation module 106 is configured to replace the node neighbourhoods of at least some user nodes with the node neighbourhoods of other user nodes based on probabilistic sampling based on calculated similarities between user node pairs. In this regard, similarity operation 302 of graph generation module 106 can be configured to define a user-user distance matrix DIST that specifies distances for each pair $(u_i, u_j)$ of the user nodes (Action 704A). Graph sampling operation 304 is configured to replace the node neighbourhoods of at least some user nodes with the node neighbourhoods of other user nodes by sampling the other user nodes based on probability values that correspond to the distances specified in the user-user distance matrix DIST (Action 704B), wherein smaller distances represent greater similarities between user nodes and correspond to greater probability values than larger distances.

In some examples, the distance specified for each pair of user nodes $(u_i, u_j)$ is based on a number of item nodes v in a union of the node neighborhoods of the pair of user nodes $(u_i, u_j)$ and a number of item nodes v in an intersection of the node neighborhoods of the pair of user nodes $(u_i, u_j)$. In some examples, the distance specified for each pair of user nodes $(u_i, u_j)$ is further based on a popularity of any item nodes v in the intersection of the node neighborhoods of the pair of user nodes $(u_i, u_j)$.

In example embodiments, non-linear function 602 is learned by generating a respective set of user and item node embeddings $E_j = \{e_{u(j,1)}, \ldots, e_{u(j,N)}\}$ and $\{e_{v(j,1)}, \ldots, e_{v(j,F)}\}$ for each of the random graph topologies $\{G_1, \ldots, G_M\}$, and determining a final set of user and item node embeddings $E_{final} = \{e^*_{u(1)}, \ldots, e^*_{u(N)}\}$ and $\{e^*_{v(1)}, \ldots, e^*_{v(F)}\}$ based on the generated sets of user and item node embeddings (Action 706A).

In example embodiments, embedding module 108 includes a averaging operation 604 that is configured to determine the final set $E_{final}$ of user and item node embeddings by averaging all the user node embeddings generated in respect of each user node across the random graph topologies $\{G_1, \ldots, G_M\}$, and averaging the item node embeddings generated in respect of each item node across the random graph topologies $\{G_1, \ldots, G_M\}$ (Action 706B).

In example embodiments, the non-linear function 602 is learned by GCCN 603, and the embedding module 108 is configured to first pre-train the GCCN 603 to generate an initial set $E_{init}$ of user and item node embeddings based on the observed bipartite graph 101 (Action 702). The embedding module 108 is configured to learn the non-linear function 602 by separately retraining the pre-trained GCCN 603 to generate the user nodes u embeddings and item node v embeddings for each of the random graph topologies $\{G_1, \ldots, G_M\}$.

In some examples, user specific item recommendations can be determined based on the user node embeddings and item node embeddings.

In the examples described above, similarity operation 302 and the graph sampling operation 304 are performed with a focus on user nodes such that graph generation module 106 produced graph topologies in which the neighborhoods of user nodes were replaced with those of other user nodes. However, in alternative embodiments, graph generation module 106 could be configured to perform similarity operation 302 and graph sampling operation 304 from the perspective of item nodes instead of user nodes. In such examples the neighborhoods of item nodes would be replaced with neighborhoods of similar item nodes to in the resulting random graph realizations. In such alternative embodiments, the process for determining similarities between item nodes and sampling item node neighborhoods to generate random graph topologies could be identical to that described above in respect of item nodes, except that the roles of the item nodes and the user nodes would be reversed.

Processing Unit

Figure 8:
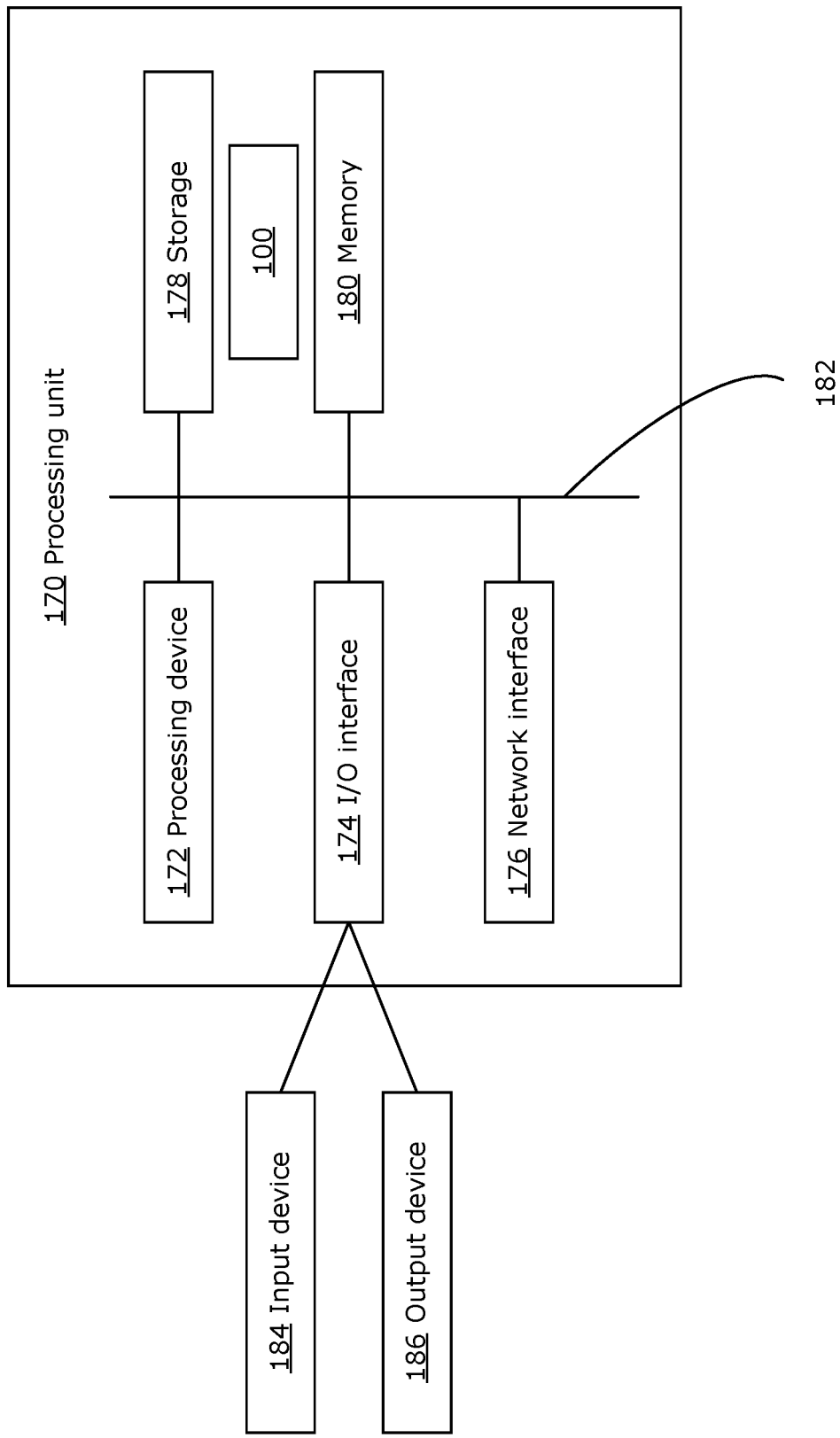
FIG. 8 is a block diagram illustrating an example processing system that may be used to execute machine readable instructions to implement the system of FIG. 2.

In example embodiments, graph processing system 100 is computer implemented using one or more computing devices. FIG. 8 is a block diagram of an example processing unit 170, which may be used in a computer device to execute machine executable instructions to implement system 100. Other processing units suitable for implementing embodiments described in the present disclosure may be used, which may include components different from those discussed below. Although FIG. 8 shows a single instance of each component, there may be multiple instances of each component in the processing unit 170.

The processing unit 170 may include one or more processing devices 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network.

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure are incorporated herein by reference.

The invention claimed is:

1. A computer implemented method for processing an observed bipartite graph that comprises a plurality of user nodes, a plurality of item nodes, and an observed graph topology that defines edges connecting at least some of the user nodes to some of the item nodes such that at least some nodes have node neighbourhoods comprising edge connections to one or more other nodes, the method comprising:

deriving a plurality of random graph topologies that are realizations of the observed graph topology by replacing the node neighbourhoods of at least some nodes with the node neighbourhoods of other nodes;

learning a non-linear function using the plurality of user nodes, plurality of item nodes and plurality of random graph topologies to generate user node embeddings and item node embeddings for the plurality of user nodes and plurality of item nodes, respectively.

2. The method of claim 1 wherein replacing the node neighbourhoods of at least some nodes with the node neighbourhoods of other nodes is based on probabilistic sampling based on calculated similarities between node pairs.

3. The method of claim 2 wherein the at least some nodes and the other nodes are each respective user nodes, and deriving the plurality of random graph topologies comprises defining a user-user distance matrix that specifies distances for each node pair of the user nodes, and replacing the node neighbourhoods of at least some nodes with the node neighbourhoods of other nodes comprises sampling the other nodes based on probability values that correspond to the distances specified in the user-user distance matrix, wherein smaller distances represent greater similarities between user nodes and correspond to greater probability values than larger distances.

4. The method claim 3 wherein the distance specified for each pair of user nodes based on a number of item nodes in a union of the node neighborhoods of the pair of user nodes and a number of item nodes in an intersection of the node neighborhoods of the pair of user nodes.

5. The method of claim 4 wherein the distance specified for each pair of user nodes is further based on a popularity of any item nodes in the intersection of the node neighborhoods of the pair of user nodes.

6. The method of claim 1 wherein learning the non-linear function comprises generating a respective set of user and item node embeddings for each of the random graph topologies using the user nodes and item nodes, and determining a final set of user and item node embeddings based on the generated sets of user and item node embeddings.

7. The method of claim 6 wherein determining the final set of user and item node embeddings comprises averaging the user node embeddings generated in respect of each user node across all the random graph topologies and averaging the item node embeddings generated in respect of each item node across all of the random graph topologies.

8. The method of claim 6, further comprising pre-training a graph convolution neural network (GCCN) to generate an initial set of user and item node embeddings based on the observed bipartite graph, wherein learning the non-linear function comprises, for each of the random graph topologies, separately retraining the pre-trained GCCN to generate the user node embeddings and item node embeddings for the random graph topology.

9. The method of claim 1 wherein:

the plurality of user nodes of the observed bipartite graph are each represented as respective user features vectors that represent attributes of respective users, the plurality of item nodes are each represented as respective item node feature vectors that represent attributes of respective items, and the observed graph topology is defined in an adjacency matrix; and the user node embeddings are a lower dimensional representation of respective user features vectors, and the item node embeddings are a lower dimensional representation of respective item features vectors.

10. The method of claim 9 comprising determining user specific item recommendations based on the user node embeddings and item node embeddings.

11. A graph processing system for processing an observed bipartite graph that comprises a plurality of user nodes, a plurality of item nodes, and a graph topology that defines edges connecting at least some of the user nodes to some of the item nodes such that at least some nodes have node neighbourhoods comprising connections to one or more other nodes, the system comprising:

a graph generation module configured to derive a plurality of random graph topologies that are realizations of the observed graph topology by replacing the node neighbourhoods of at least some nodes with the node neighbourhoods of other nodes;

an embedding module configured to learn a non-linear function using the plurality of user nodes, plurality of item nodes and the random graph topologies to generate user node embeddings and item node embeddings for the plurality of user nodes and plurality of item nodes, respectively.

12. The system of claim 11 wherein the graph generation module is configured to replace the node neighbourhoods of at least some nodes with the node neighbourhoods of other nodes based on probabilistic sampling based on calculated similarities between node pairs.

13. The system of claim 12 wherein the at least some nodes and the other nodes are user nodes and the graph generation module includes:

a similarity operation that is configured to define a user-user distance matrix that specifies distances for each node pair of the user nodes;

a graph sampling operation configured to replace the node neighbourhoods of at least some user nodes with the node neighbourhoods of other user nodes by sampling the other user nodes based on probability values that correspond to the distances specified in the user-user distance matrix, wherein smaller distances represent greater similarities between user nodes and correspond to greater probability values than larger distances.

14. The system of claim 13 wherein the distance specified for each pair of user nodes based on a number of item nodes in a union of the node neighborhoods of the pair of user nodes and a number of item nodes in an intersection of the node neighborhoods of the pair of user nodes.

15. The system of claim 14 wherein the distance specified for each pair of user nodes is further based on a popularity of any item nodes in the intersection of the node neighborhoods of the pair of user nodes.

16. The system of claim 11 wherein the embedding module is configured to learn the non-linear function by generating a respective set of user and item node embeddings for the non-linear function for each of the random graph topologies, and determining a final set of user and item node embeddings based on the generated sets of user and item node embeddings.

17. The system of claim 16 wherein the embedding module includes an averaging operation configured to determine the final set of user and item node embeddings by averaging the user node embeddings generated in respect of each user node across all of the random graph topologies and averaging the item node embeddings generated in respect of each item node across all of the random graph topologies.

18. The system of claim 16 wherein the non-linear function is implemented using a graph convolution neural network (GCCN), the embedding module 108 being configured to pre-train the GCCN to generate an initial set of user and item node embeddings based on the user nodes, item nodes and observed graph topology of the observed bipartite graph, and to learn the non-linear function by separately retraining the pre-trained GCCN to generate the user node embeddings and item node embeddings for each of the random graph topologies.

19. The system of claim 11 wherein the plurality of user nodes of the observed bipartite graph are each represented as respective user features vectors that represent attributes of respective users, the plurality of item nodes are each represented as respective item node feature vectors that represent attributes of respective items, and the graph topology is defined in an adjacency matrix that specifies the edges connecting user nodes to item nodes to represent an interaction history between user nodes and item nodes; and the user node embeddings are a lower dimensional representation of respective user features vectors, and the item node embeddings are a lower dimensional representation of respective item features vectors.

20. The system of claim 11 including a recommender selection operation configured to determine user specific item recommendations based on the user node embeddings and item node embeddings.

* * * * *

UNITED STATES PATENT AND TRADEMARK OFFICE
CERTIFICATE OF CORRECTION

| | | |
|---|---|---|
| PATENT NO. | : 11,494,617 B2 | Page 1 of 1 |
| APPLICATION NO. | : 16/789325 | |
| DATED | : November 8, 2022 | |
| INVENTOR(S) | : Jianing Sun et al. | |

It is certified that error appears in the above-identified patent and that said Letters Patent is hereby corrected as shown below:

In the Specification

In Column 10, Line 25, Equation 4 should appear as follows:

$$p(\mathcal{G}|\mathcal{G}_{obs},\varsigma) = \prod_{j=1}^{N} \epsilon^{\mathbb{1}\{g_j = g_{obs,j}\}} (1-\epsilon)^{\mathbb{1}\{g_j = g'_{obs,\varsigma}\}}$$

Signed and Sealed this
Thirty-first Day of January, 2023

Katherine Kelly Vidal
*Director of the United States Patent and Trademark Office*